L. MOHRENWITZ.
HEATING APPARATUS FOR TABLEWARE, SUCH AS PLATES, DISHES, OR THE LIKE.
APPLICATION FILED OCT. 26, 1910.

1,049,385. Patented Jan. 7, 1913.

WITNESSES:

INVENTOR
Ludwig Mohrenwitz
BY
B. Singer
ATTORNEY

UNITED STATES PATENT OFFICE.

LUDWIG MOHRENWITZ, OF SCHWEINFURT, GERMANY.

HEATING APPARATUS FOR TABLEWARE, SUCH AS PLATES, DISHES, OR THE LIKE.

1,049,385. Specification of Letters Patent. Patented Jan. 7, 1913.

Application filed October 26, 1910. Serial No. 589,253.

*To all whom it may concern:*

Be it known that I, LUDWIG MOHRENWITZ, of Schweinfurt-on-the-Main, Bavaria, Germany, have invented an Improvement in or Relating to Heating Apparatus for Tableware, such as Plates, Dishes, or the Like, of which the following description, in connection with the accompanying drawing, is a specification.

This invention relates to a device for heating plates, dishes or the like, and for keeping such articles hot, and comprises a metal plate surrounded at the sides and at the bottom with an insulating and heat maintaining material, the said plate being introduced into the bottom hollow space of plates and dishes.

Hitherto food has been kept warm either by providing double walls in the receiving vessels, so that hot water could be poured into the hollow space thus produced, or placing the vessels on a support filled with hot water or made of insulating material such as asbestos.

For plates and dishes which are to be placed empty on the table or are to be passed on from hand to hand, the device in question is unsuitable as it would make the table ware too unwieldly. On the contrary, the device according to this invention is such that the table ware with which it is combined, is not altered as regards its outer shape, and is not rendered much heavier.

A construction according to this invention is illustrated by way of example in the accompanying drawings in which—

Figure 1:
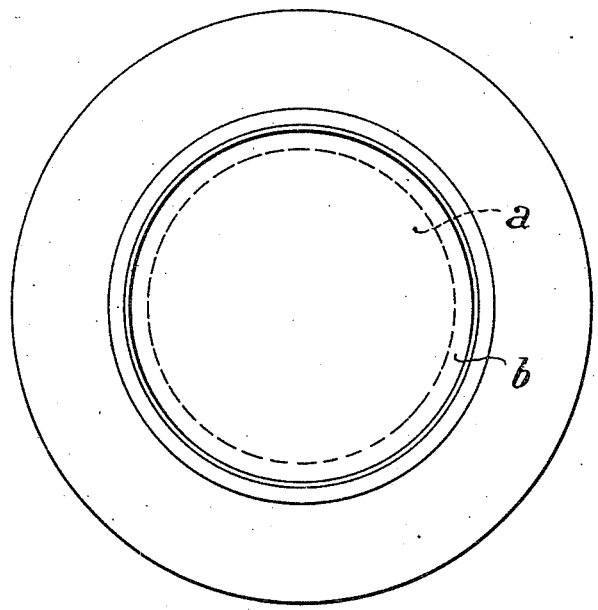
Figure 2:
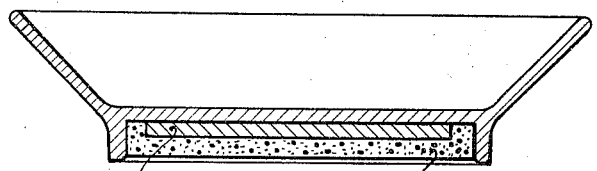

Figures 1 and 2 are respectively a plan and a vertical section.

The metal plate $a$ which having been heated, forms a heat radiating device, and is provided laterally and at the bottom with an insulating casing $b$, for instance of asbestos. The plate $a$ thus covered is introduced, after the heating of the plate $a$, into the bottom hollow space of a plate which, of course, must be sufficiently deep and exactly fit the heating plate, so that the latter is jammed in it.

In order to enable the heating device to be easily removed from the plate after use, the insulating casing can be provided preferably with a handle concealed in a small recess.

Having now particularly described and ascertained the nature of my said invention and in what manner the same is to be performed, I declare that what I claim is:—

A food receiver having a cavity in the bottom thereof, in combination with a removable heating member disposed in said cavity against a portion of the receiver to heat the same, and a heat insulating element removably supported in said cavity for supporting said heating member in engagement with said receiver and preventing heat radiating outwardly from said receiver, substantially as described.

In testimony whereof I affix my signature in presence of two witnesses.

LUDWIG MOHRENWITZ.

Witnesses:
 GEORG LERTNER,
 E. HELLMUTH.